(12) United States Patent
Nagai

(10) Patent No.: US 7,881,174 B2
(45) Date of Patent: Feb. 1, 2011

(54) OPTICAL PICKUP APPARATUS

(75) Inventor: Fumio Nagai, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 747 days.

(21) Appl. No.: 11/781,711

(22) Filed: Jul. 23, 2007

(65) Prior Publication Data

US 2008/0025188 A1    Jan. 31, 2008

(30) Foreign Application Priority Data

Jul. 26, 2006    (JP)    ............... 2006-203406

(51) Int. Cl.
*G11B 7/00*    (2006.01)
(52) U.S. Cl. ............... 369/112.17; 369/112.16; 369/112.01
(58) Field of Classification Search ............ 369/112.16, 369/112.17
See application file for complete search history.

(56) References Cited

U.S. PATENT DOCUMENTS

| | | | | |
|---|---|---|---|---|
| 6,775,221 | B1 * | 8/2004 | Fukumoto | 369/112.16 |
| 7,660,226 | B2 * | 2/2010 | Ogata | 369/112.18 |
| 2006/0246376 | A1 * | 11/2006 | Nishino | 430/270.15 |

FOREIGN PATENT DOCUMENTS

WO    WO2006093326    *    9/2006

OTHER PUBLICATIONS

Ogata, T., "Multi-Layer Disc Read-Out Technology Using Photonic Crystal", pp. 1-32, Mar. 17, 2006.

* cited by examiner

*Primary Examiner*—Lixi Chow
(74) *Attorney, Agent, or Firm*—Finnegan, Henderson, Farabow, Garrett & Dunner, L.L.P.

(57) ABSTRACT

The present invention provides an optical pickup apparatus to for recording and/or reproducing information on an optical information recording medium including multilayered information recording surfaces. The optical pickup apparatus includes: a light source; an objective lens; a first optical element including a first optical area and a second optical area; a second optical element including a third optical area and a fourth optical area. The optical pickup apparatus further includes a light-converging element for receiving a main light flux from one information recording surface and a secondary light flux from another information recording surface and converging the main light flux at a position between the first optical element and the second optical element. The optical pickup apparatus further includes a polarization splitting optical member for splitting the main light flux and the secondary light flux; and a photodetector for receiving the main light flux.

10 Claims, 13 Drawing Sheets

(CONDITIONS : δ=10 μm, NA0.85, λ 405nm, REFRACTIVE INDEX OF DISK n=1.6)

BD

FIG. 6 ( b )
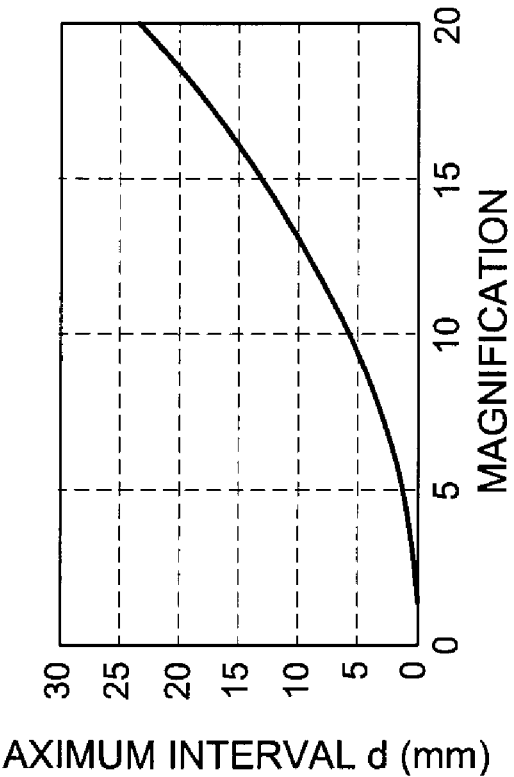
FIG. 6 ( a )
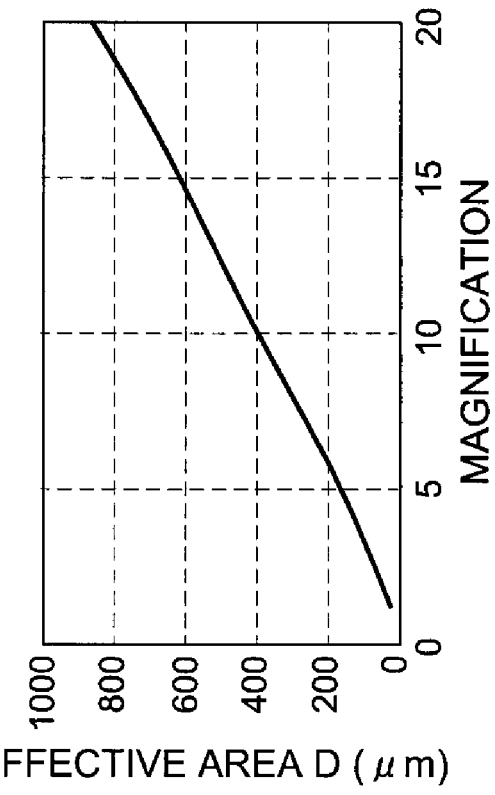
HD DVD
(CONDITIONS : δ=20 μm, NA0.65, λ 405nm, REFRACTIVE INDEX OF DISK n=1.6)

HD DVD (CONDITIONS : λ 405nm, NA0.65, MAGNIFICATION=5, REFRACTIVE INDEX OF DISK n=1.6)

DVD (CONDITIONS : λ 658nm, NA0.65, MAGNIFICATION=5, REFRACTIVE INDEX OF DISK n=1.6)

OPTICAL PICKUP APPARATUS

This application is based on Japanese Patent Application No. 2006-203406 filed on Jul. 26, 2006, in Japanese Patent Office, the entire content of which is hereby incorporated by reference.

TECHNICAL FIELD

The present invention relates to an optical pickup apparatus preferably using an optical disc having multilayered information recording surfaces.

BACKGROUND

An optical disc represented by a DVD can record a large amount of information signals in high density, so that its use is promoted in many fields of audio, video, and computer. Particularly in recent years, to meet requirements of further increasing in recording capacity, an optical disc having many layers of information recording surfaces has been developed and is already commercially available.

On the other hand, in an optical disc having multilayered information recording surfaces whose distance are small, when a light flux for recording and reproducing information is converged on a certain recording and reproducing surface, the reflected light from the recording and reproducing surface is affected by the reflected light from the neighboring recording and reproducing surface. It causes a fear that the reflected light from the recording and reproducing surface may be recognized as noise. With regard to the problems, there is known an optical pickup apparatus for suppressing noise by combining two wave plates each including two areas having different polarization characteristics as disclosed in the following document:

Sixth Optical Disc Informal Gathering Program Lecture Material "Inter-layer Separation Detection of Multilayer Disc Using Photonic Crystal", by Tetsuya Ogata, Mar. 17, 2006.

Here, in the optical pickup apparatus disclosed in the above document, a light flux reflected from the information recording surface of the optical disc passes through the first wave plate, then is converged between the first wave plate and the second wave plate, furthermore passes the second wave plate, and passes the polarized beam splitter. When the light flux passes the polarized beam slitter, the noise component is removed and only a normal signal enters the photodetector. However, in the optical pickup apparatus disclosed in the above document, the magnification of the light-converging lens and the interval between the first wave plate and the second wave plate are not specified.

In the optical pickup apparatus, depending on the magnification, it has possibility for example that the light including the normal information and the light including the noise component are hard to be separated and the alignment of the first and second optical elements becomes difficult because the interval between the first wave plate and the second wave plate and an effective area of the first wave plate and the second wave plate becomes small, or alternatively that the size of the optical pickup apparatus becomes excessively large.

SUMMARY

The present invention has been developed with the foregoing problem in view and is intended to provide an optical pickup apparatus for effectively removing noise when using an optical information recording medium having multilayered information recording surfaces.

An optical pickup apparatus according to the present invention is provided for recording and/or reproducing information by converging a light flux from a light source on any one of multilayered information recording surfaces of an optical information recording medium through an objective lens. The optical pickup apparatus includes: a light source; an objective lens for converging a light flux from the light source onto one of the multilayered information recording surfaces; a first optical element comprising a first optical area and a second optical area; and a second optical element comprising a third optical area and a fourth optical area. In the optical pickup apparatus, a main light flux is a light flux which is reflected by the information recording surface where the light flux from the light source is converged, and a secondary light flux is a light flux reflected by the other information recording surface. The optical pickup apparatus further includes a light-converging element for receiving the main light flux and the secondary light flux and conversing the main light flux at the position between the first optical element and the second optical element; a polarization splitting optical member; and a photodetector.

In the optical pickup apparatus, the main light flux passing through the first optical area and the fourth optical area has a first polarization direction, and the light flux passing through the second optical area and the third optical area has a first polarization direction. The secondary light flux passing through the first optical area and the third optical area has a second polarization direction and the secondary light flux passing through the second optical area and the fourth optical area has a second polarization direction. In the optical pickup apparatus, a magnification when the light flux reflected by the one of the multilayered information recording surfaces is converged by the light-converging element, and a numerical aperture NA of the objective lens satisfies the predefined condition.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 6(a) is a drawing showing the relationship between the magnification and the maximum distance and FIG. 6(b) is a drawing showing the relationship between the magnification and the effective area, when HD DVD is used as an optical disc;

DESCRIPTION OF THE PREFERRED EMBODIMENTS

Figure 1:
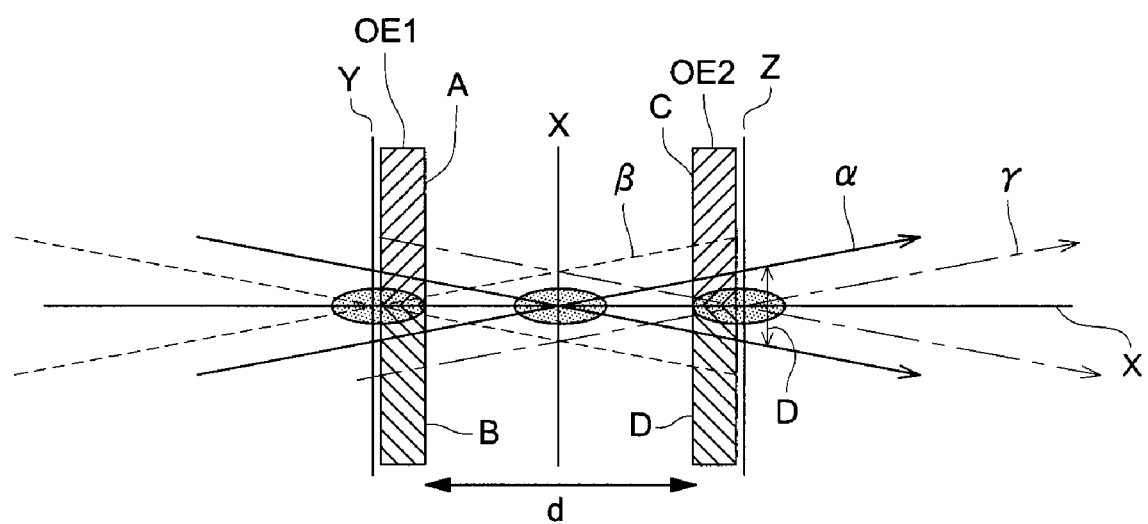
FIG. 1 is a drawing for explaining the principle of the present invention.

The preferred embodiment of the present invention is described below.

An optical pickup apparatus according to the present invention is provided for recording and/or reproducing information on an optical information recording medium including multilayered information recording surfaces. The optical pickup apparatus comprising: a light source; an objective lens for converging a light flux from the light source onto one of the multilayered information recording surfaces; a first optical element comprising a first optical area and a second optical area which are arranged on both sides of an optical axis; a second optical element comprising a third optical area and a fourth optical area which are arranged on both sides of the optical axis; and a light-converging element. The a light-converging element is provided for receiving a main light flux and a secondary light flux and converging the main light flux at a position between the first optical element and the second optical element, where the main light flux is a light flux reflected by the one of the multilayered information recording surfaces on which the light flux from the light source is converged and the secondary light flux is a light flux reflected by another of the multilayered information recording surfaces. The optical pickup apparatus further comprising a polarization splitting optical member for splitting the main light flux and the secondary light flux each emitted from the first optical element and the second optical element; and a photodetector for receiving the main light flux. The optical pickup apparatus records and/or reproduces information by converging the light flux from the light source on the one of the multilayered information recording surfaces through the objective lens. In the optical pickup apparatus, the first optical area and the fourth optical area provide a first polarization direction with the main light flux passing through the first optical area and the fourth optical area, and the second optical area and the third optical area provide a first polarization direction with the main light flux passing through the second optical area and the third optical area. In the optical pickup apparatus, the first optical area and the third optical area provide a second polarization direction with the secondary light flux passing through the first optical area and the third optical area, and the second optical area and the fourth optical area provide a second polarization direction with the secondary light flux passing through the second optical area and the fourth optical area.

In the optical pickup apparatus, the main light flux passes through the first optical element, and is converged between the first optical element and the second optical element by the light-converging element. Then, the light flux passes through the second optical element, and enters into the photodetector through the polarization splitting optical member. In the optical pickup apparatus, the secondary light flux passes through the first optical element, and is not converged between the first optical element and the second optical element by the light-converging element. Then the light flux passes through the second optical element, and does not enter into the photodetector by being split out by the polarization splitting optical member. The optical pickup apparatus satisfies the following expression (1).

$$NA/0.35 \leq m \leq NA/0.05 \quad (1)$$

Where, m is a magnification when the light flux reflected by the one of the multilayered information recording surfaces is converged by the light-converging element, and NA is a numerical aperture of the objective lens on an optical information recording medium side.

In the present specification, "an optical axis" means the center of the light flux passing through an element and the magnification "m" is represented by the absolute value.

The principle of the present invention will be explained with reference to FIG. 1. FIG. 1 shows a partial cross sectional view in the optical axial direction of an optical pickup apparatus relating to the present invention. In the partial cross sectional view, the first optical element OE1 includes a first optical area A above an optical axis X and a second optical area B below the optical axis X. In other words, the first optical area A and the second optical area B are arranged so as to sandwich the optical axis X. Further, the second optical element OE2 positioned at a predetermined distance d from the first optical element OE1 along the optical axis has a third optical area C above the optical axis X and a fourth optical area D below the optical axis. In other words, the third optical area C and the fourth optical area D are arranged so as to sandwich the optical axis X. Each of the optical areas A to D has a function for causing a phase difference of λ/4 to the light flux which passing through each optical area. The optical areas A and B cause phase difference in the opposite directions to each other and the optical areas C and D cause phase difference in the opposite directions to each other. Further, the optical areas A and C which face to each other cause phase difference in the opposite directions to each other and the optical areas B and D which face to each other also cause phase difference in the opposite directions to each other. As a concrete example, it may be considered that these optical areas provide a phase difference of +λ/4 with the light flux passing through the first optical area A, and provide a phase difference of −λ/4 with the light flux passing through the second optical area B. Further, it may be considered that these optical areas provide a phase difference of −λ/4 with the light flux passing through the third optical area C, and provide a phase difference of +λ/4 with the light flux passing through the fifth optical area D.

Another example can be considered that these optical areas provide a phase difference of +λ/2 with the light flux passing through the first optical area A, provide no phase difference with the light flux passing through the second optical area B, provide a phase difference of +λ/2 with the light flux passing through the third optical area C, and provide no phase difference with the light flux passing through the fourth optical area D.

Here, it is assumed that from the left of FIG. 1, the reflected light in the linear polarization state is emitted from the information recording surface of the optical information recording medium. In the optical information recording medium having multilayered information recording surfaces, solid lines indicate a marginal light beam α of reflected light from an object information recording surface on which information is to be recorded and/or reproduced, and dotted lines indicate a marginal light beam β of reflected light from an information recording surface located at a deeper position than the object information recording surface, and dashed-dotted lines indicates a marginal light beam γ of reflected light from an information recording surface located at a shallower position than the object information recording surface. Namely, the light flux having the marginal light beam α is normal information recording light and each of light fluxes having the marginal light beams β and γ is a noise component light.

In the optical pickup apparatus, light is converged at a position having a conjugate relationship to the information recording surface where the light is reflected. Therefore, when the light flux having the marginal light beam α is converged at a position X between the first optical element OE1 and the second optical element OE2 along the optical axial, the light flux having the marginal light beam β is converged at a position Y on the optical information recording medium side (on the left of FIG. 1) from the position X, and the light flux having the marginal light beam γ is converged at a position Z on the photodetector side (on the right of FIG. 1) from the position X.

Therefore, out of the light flux having the marginal light beam α, the light portion passing the first optical area A always passes the fourth optical area D, and furthermore, the light portion passing the second optical area B always passes the third optical area C. Therefore, the light flux having the marginal light beam α after emitted from the second optical element OE2 is different by 90° in the polarization direction (the first polarization direction) from that before entering the first optical element OE1.

On the other hand, out of the light flux having the marginal light beam β, the light portion passing the first optical area A passes the third optical area C, and furthermore, the light portion passing the second optical area B passes the fourth optical area D. Therefore, the light flux having the marginal light beam β after emitting from the second optical element OE2 is not changed in the polarization direction (the second polarization direction different from the first polarization direction) from that before entering the first optical element OE1.

Similarly, out of the light flux having the marginal light beam γ, the light portion passing the first optical area A passes the third optical area C, and furthermore, the light portion passing the second optical area B passes the fourth optical area D. Therefore, the light flux having the marginal light beam γ after emitting from the second optical element OE2 is not changed in the polarization direction (the second polarization direction different from the first polarization direction) from that before entering the first optical element OE1.

As mentioned above, the normal information recording light (may be referred to as a main light flux) and the noise component light (may be referred to as a secondary light flux) are different in the polarization direction, for example, by 90°. Therefore, when making the outgoing light flux from the second optical element OE2 pass through a polarization splitting optical member such as a polarized beam splitter, for example, the polarization splitting optical member reflects the normal information recording light and transmits the noise component light, thus the noise component can be removed. Alternatively, it is also possible to transmit the normal information recording light and lead it to the photodetector and reflect the noise component light. Further, the polarization splitting optical member is not limited to the polarized beam splitter. For example, a linear polarization plate for passing only the normal information recording light in a predetermined polarization state may be used.

Figure 13B:
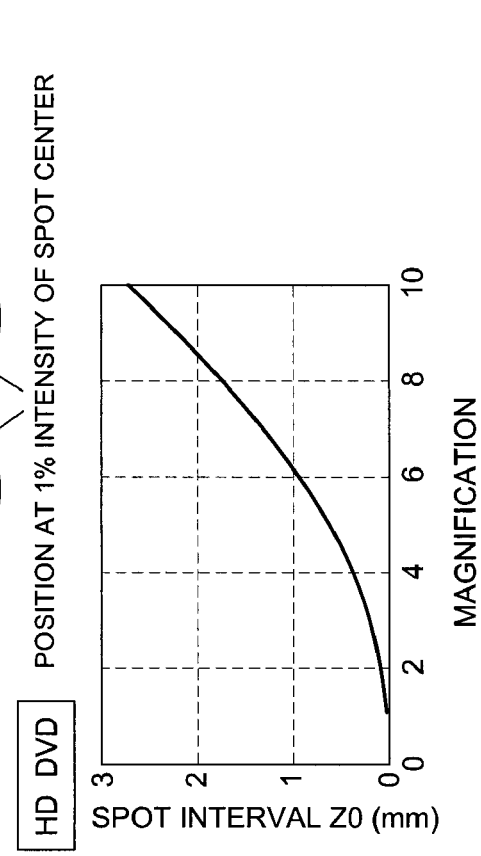
FIG. 13 is a drawing showing the relationship between the spot interval and the magnitude.
Figure 13A:
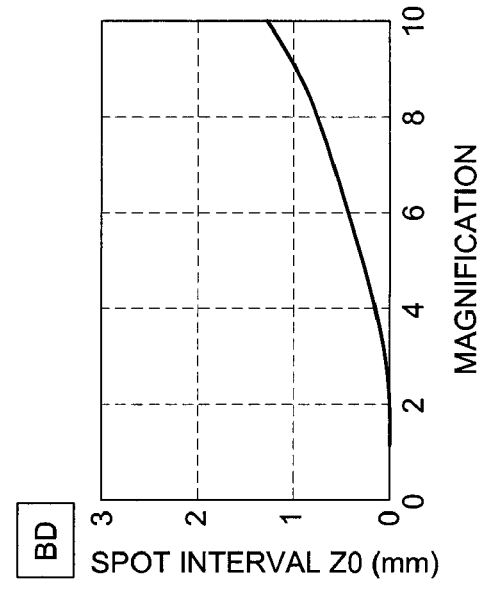
Figure 13C:
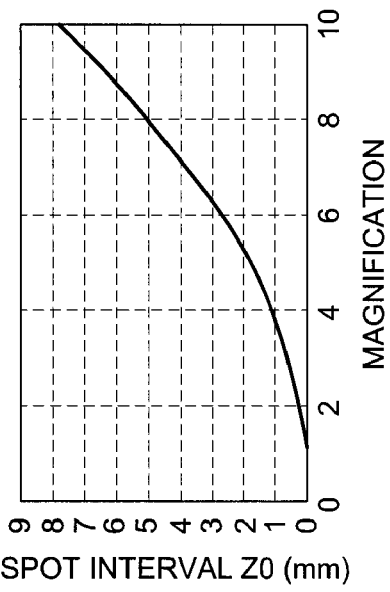

Furthermore, the meaning of conditional expression (1) will be explained. When the magnification m is reduced below the lower limit of the expression (1), an interval d between the first optical element and the second optical element becomes extremely smaller, and the two optical elements can be hardly aligned, and the shift sensitivity in the vertical direction to the optical axis becomes high. Furthermore, when the magnification m is reduced below the lower limit of the expression (1), it is difficult to separate the normal information recording light from the noise component light. The reason is that when the normal information recording light and noise component light are converged by a light-converging element, an interval Z0 between the converged light spots in the optical axial direction is proportional to almost the square of the magnification m (Z0∝m$^2$). Therefore, when the magnification m is reduced below the lower limit of the expression (1), the interval between the spots in the optical axial direction is shortened, and in correspondence to it, the interval d must be shortened. Here, defining that a spot edge of a spot converged by the light-converging element is a position along an optical axis where the intensity of the spot becomes 1% of the spot center, the spot interval Z0 indicates the interval between the spot edge of the reflected light from the information recording layer on which information is to be recorded and/or reproduced and the spot edge of the reflected light from the information recording layer neighboring the above information recording layer. FIG. 13 shows the relationship between the spot interval and the magnification for each type of optical disc.

Further, when the magnification m becomes smaller, an effective area D of the first optical element and the second optical element become smaller, and the alignment accuracy is strict. It causes a fear that the error sensitivity in the vertical direction to the optical axis may increase. The effective area D of the first optical element and the second optical element, assuming the distance between layers of the optical information recording medium as δ, is decided by D 26-NA-m. Therefore, when the magnification m is reduced below the lower limit of the expression (1), the effective area D becomes smaller, and the accuracy is degraded. It causes a fear that the signal optical reading accuracy may be lowered.

When the magnification m is increased above the upper limit of the expression (1), it causes a fear that the first optical element and the second optical element themselves become excessively larger, and the optical system composed of the light-converging element, first optical element, and second optical element becomes excessively larger, and the entering spot diameter to the first optical element, that is, the effective area D may become excessively smaller. When the magnification m is increased above the upper limit of the expression (1), the converged spot interval Z0 becomes longer, thereby it is preferable to separate signal light. Though, there is a fear that it may cause enlargement of the optical pickup optical system. When the first optical element and second optical element are arranged so as to have an interval d almost equivalent to the length of the spot interval Z0, the constitution becomes larger. On the other hand, when it is intended to make the constitution of the first optical element and second optical element smaller, since the NA of the converged spot is small, the effective area D becomes smaller. It causes a fear that the alignment may become difficult. Further, only the neighborhood of the boundary area around the effective area D is used, so that there is a fear of deterioration of the performance.

Accordingly, an optical pickup apparatus relating to the present invention is prevented from these problems by satisfying the expression (1).

The optical pickup apparatus relating to the present invention preferably satisfy the expression (1').

$$NA/0.33 \leq m \leq NA/0.08 \tag{1'}$$

In the optical pickup apparatus relating to the present invention, the light flux emitted by the light source may have a wavelength $\lambda 1$ satisfying 350 nm$\leq \lambda 1 \leq$450 nm, and when the numerical aperture NA is 0.8 or more, a distance $\delta$ between the multilayered information recording surfaces of the information recording medium may satisfy a following expression (2).

$$3.6\ \mu m \leq \delta \leq 35\ \mu m \tag{2}$$

The conditional expression (2) specifies the distance $\delta$ when the optical information recording medium which is mainly used is a BD (Blu-ray Disc). When the distance $\delta$ is reduced below the lower limit of the expression (2), the maximum distance d between the first optical element and the second optical element is shortened, so that the two optical elements can be hardly aligned. It causes a fear that the shift sensitivity in the vertical direction to the optical axis may become high. Furthermore, when the distance $\delta$ between disc layers is reduced below the lower limit of the expression (2), the effective area D also becomes smaller, thus there is a fear that the shift sensitivity in the vertical direction to the optical axis may become high. Here, defining that a spot edge of a spot is a position along an optical axis where the intensity of the spot becomes 1% of the spot center, the maximum distance d indicates the maximum distance between the first optical element and the second optical element such that, when reading reflected light from the information recording layer on which information is to be recorded and/or reproduced, the spot edge of the reflected light from the information recording layer neighboring the above information recording layer is not positioned between the first optical element and the second optical element.

On the other hand, when the distance $\delta$ is increased above the upper limit of the expression (2), increase of the distance of the information recording surface causes a large spherical aberration when reading signal by one objective lens. There is a fear that the neighboring signal may not be read. Further, when the distance of the information recording surface is large, in correspondence to it, the BD becomes thicker. It makes actual difficulty in design of the optical pickup apparatus design, which is a problem.

The optical pickup apparatus relating to the present invention is prevented from these problems by satisfying the expression (2), which is preferable.

In the optical pickup apparatus relating to the present invention, the light flux emitted by the light source may have a wavelength $\lambda 1$ satisfying 350 nm$\leq \lambda 1 \leq$450 nm, and when the numerical aperture NA is less than 0.8, a distance $\delta$ between the multilayered information recording surfaces of the information recording medium may satisfy the following expression (3).

$$4.3\ \mu m \leq \delta \leq 80\ \mu m \tag{3}$$

The conditional expression (3) specifies the distance $\delta$ when the optical information recording medium which is mainly used is HD. When the distance $\delta$ is reduced below the lower limit of the expression (3), the maximum distance d between the first optical element and the second optical element is shortened, so that the two optical elements can be hardly aligned. It causes a fear that the shift sensitivity in the vertical direction to the optical axis may become high. Furthermore, when the distance $\delta$ is reduced below the lower limit of the expression (3), the effective area D also becomes smaller. Thus it causes a fear that the shift sensitivity in the vertical direction to the optical axis may become furthermore higher.

On the other hand, when the distance $\delta$ is increased above the upper limit of the expression (3), the increase of the distance of the information recording surface causes a larger spherical aberration when reading a signal by one objective lens and it causes a fear that the neighboring signal may not be read. Further, when the distance of the information recording surface is large, in correspondence to it, the HD becomes thicker. It makes actual difficulty in design of the optical pickup apparatus design, which is a problem.

The optical pickup apparatus relating to the present invention is prevented from these problems by satisfying the expression (3), which is preferable.

In the optical pickup apparatus relating to the present invention, the light flux emitted by the light source may have a wavelength $\lambda 2$ satisfying 600 nm$\leq \lambda 2 \leq$700 nm, and when the numerical aperture NA is less than 0.8, a distance $\delta$ between the multilayered information recording surfaces of the information recording medium may satisfy the following expression (4).

$$5.5\ \mu m \leq \delta \leq 100\ \mu m \tag{4}$$

The conditional expression (4) specifies the when the optical information recording medium which is mainly used is DVD. When the distance $\delta$ is reduced below the lower limit of the expression (4), the maximum distance d between the first optical element and the second optical element is shortened, so that the two optical elements can be hardly aligned. It causes a fear that the shift sensitivity in the vertical direction to the optical axis may become high. Furthermore, when the distance $\delta$ is reduced below the lower limit of the expression (4), the effective area D also becomes smaller, thus there is a fear that the shift sensitivity in the vertical direction to the optical axis may become high.

On the other hand, when the distance $\delta$ is increased above the upper limit of the expression (4), the increase of the distance of the information recording surface causes a larger spherical aberration when reading a signal by one objective lens and there is a fear that the neighboring signal may not be read. Further, when the distance of the information recording surface is large, in correspondence to it, the DVD becomes thicker. It makes actual difficulty in design of the optical pickup apparatus design, which is a problem.

The optical pickup apparatus relating to the present invention is prevented from these problems by satisfying the expression (4), which is preferable.

In an optical pickup apparatus relating to the present invention, the first optical element and the second optical element can be integrated in one body.

An optical pickup apparatus relating to the present invention may further includes a reflection optical element on an optical path between the first optical element and the second optical element. It allows to bend the optical path of optical elements in the optical pickup apparatus and allows the optical pickup apparatus to be miniaturized.

In an optical pickup apparatus relating to the present invention, the first optical element, the second optical element, and the reflection optical element can be integrated in one body.

An optical pickup apparatus relating to the present invention may further includes a first reflection surface for reflecting a light flux to enter into the first optical element; and a second reflection surface for reflecting a light flux emitted by the second optical element.

In an optical pickup apparatus relating to the present invention, only when a light flux with a predefined wavelength enters into the first optical element and the second optical element, the main light flux and the secondary light flux each of which has been emitted by the first optical element and the second optical element may have different polarization directions from each other.

The first optical element and second optical element have preferably a structural birefringence structure. Here, the structural birefringence will be explained. The structural birefringence is referred to as birefringence caused by the directional property of fine structures. As the structural birefringence, it is known that, for example, a fine periodic structure (the so-called line and space structure) composed of flat plates having no birefringence characteristic and different refractive indexes which are arranged in parallel in a cycle ($<\lambda/2$) sufficiently shorter than the wavelength of light generates a birefringence characteristic (refer to "Principle of Optics", Max Born and Emil Wolf, PERGAMON PRESS LTD.). A refractive index $n_p$ for light having a polarization direction parallel with the groove and a refractive index $n_v$ for light perpendicular to the groove are indicated below.

$$n_p = (tn_1^2 + (1-t)n_2^2)^{1/2} \quad (5)$$

$$n_v = 1/(t/n_1^2 + (1-t)/n_2^2)^{1/2} \quad (6)$$

Where, $n_1$ and $n_2$ indicate respectively the refractive index of the material (the line) for forming the fine periodic structure and the refractive index of the material (the space) for filling up the groove and t indicates a duty ratio of the fine periodic structure. Assuming the line width as $w_1$ and the space width as $w_2$, the following formula is held.

$$t = w_1/(w_1 + w_2) \quad (7)$$

According to the fine periodic structure, wave plates equal in the phase difference but different in the optical axial direction can be easily manufactured integrally, and the loss area which occurs on the boundary between the wave plates can be controlled to several μm or less, thus the loss of the information recording light can be reduced and the unnecessary light cutoff performance can be improved.

The birefringence characteristics of materials such as crystal and calcite are intrinsic to the materials thereof and can be hardly changed, while the birefringence characteristic of the fine periodic structure can be controlled easily by changing the material and shape thereof. Further, when Re indicates a phase difference (retardation amount) between light having a polarization direction parallel with the groove and light having a polarization direction perpendicular to the groove, and h indicates the height (the depth of the groove) of the birefringence structure of the fine periodic structure, the following expression is held.

$$Re = (n_p - n_v)h \quad (8)$$

From these expressions, it can be found that by changing the duty ratio t of the birefringence structure of the fine periodic structure and the height (the depth of the groove) h of the birefringence structure of the fine periodic structure, the phase difference (retardation amount) Re can be changed.

For example, when intending to form an optical element which is a $\lambda/4$ wave plate for a 400 nm laser beam, using a resin material having a refractive index of about 1.5 at normal temperature and assuming the line width as 100 nm and the space width as 90 nm, it is necessary to set the height h of the fine structure to 1200 nm. Namely, the aspect ratio becomes about 12.

In this specification, the objective lens, in a narrow sense, indicates a lens having a light-converging action which is arranged at a position closest to the optical information recording medium with facing the optical information recording medium in the state that an optical information recording medium is loaded in the optical pickup apparatus. Therefore, in this specification, the numerical aperture NA of the objective lens at the optical information recording medium side (image side) indicates the numerical aperture NA of the surface positioned on the closest side to the optical information recording medium in the objective lens.

According to the present invention, when using an optical information recording medium having a multilayered information recording surfaces, an optical pickup apparatus capable of effectively removing noise can be provided.

Figure 2:
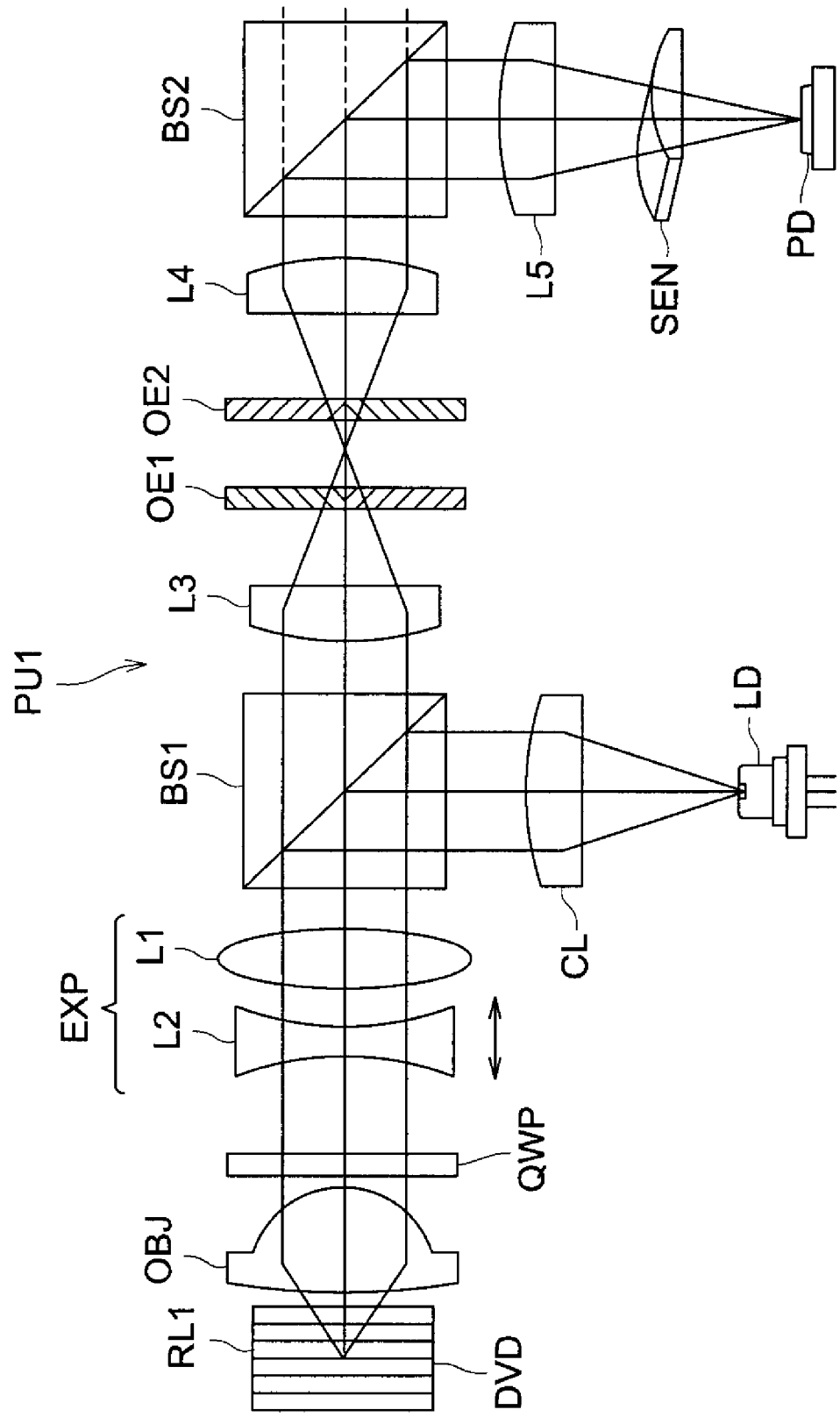
FIG. 2 is a drawing showing schematically the constitution of an optical pickup apparatus PU1 of the present embodiment for appropriately recording and reproducing information on a DVD which is an optical information recording medium (may be referred to as an optical disc) having multilayered information recording surfaces.

Hereinafter, the embodiments of the present invention will be explained with reference to the accompanying drawings. FIG. 2 is a drawing schematically showing the constitution of the optical pickup apparatus PU1 of the embodiment for appropriately recording and reproducing information for DVD which is an optical information recording medium (may be referred to as an optical disc) having multilayered information recording surfaces. Further, needless to say, the present invention can be applied to an optical pickup apparatus for a BD (Blu-ray Disc), HD DVD, DVD, CD, and other optical discs.

Figure 3:
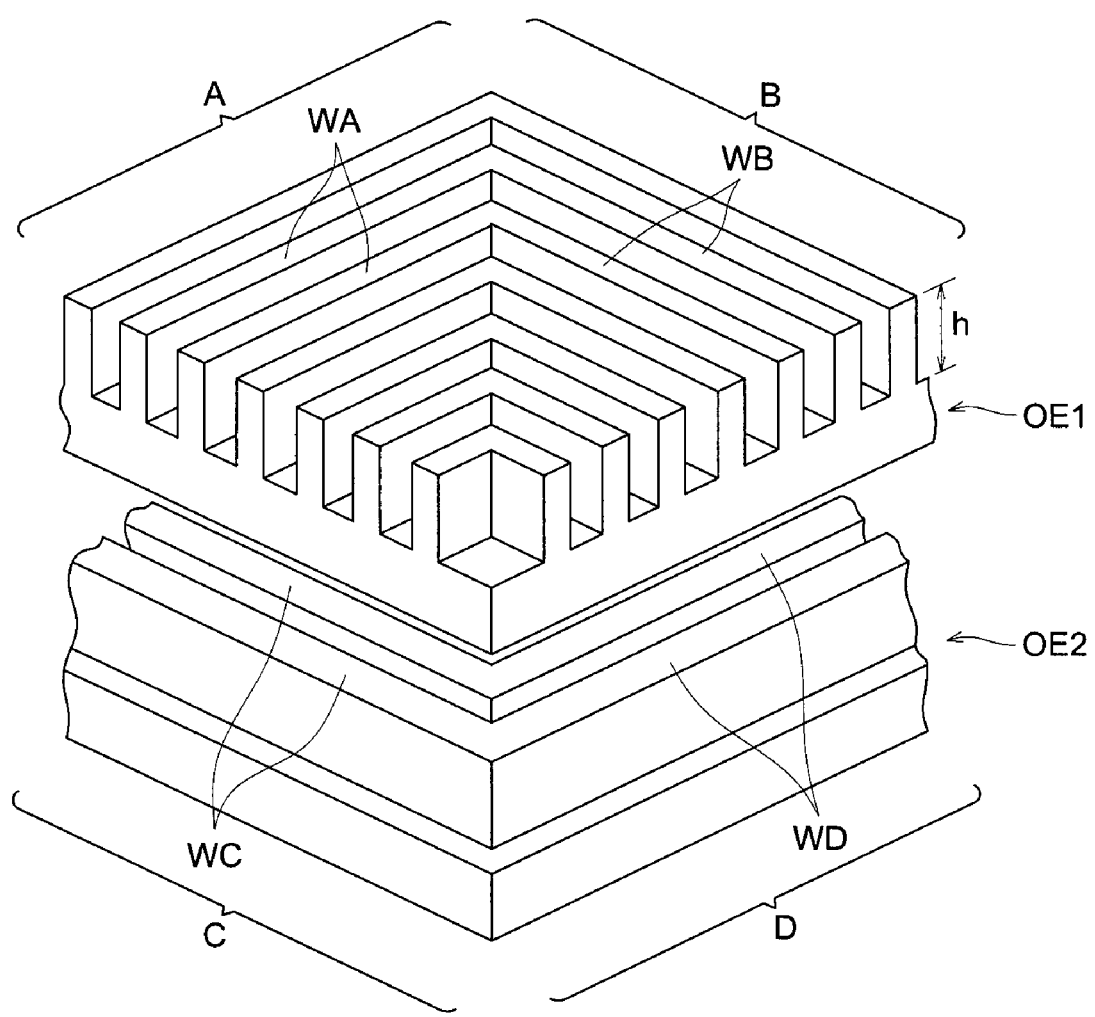
FIG. 3 is a perspective view showing a first wave plate OE1 which is a first optical element and a second wave plate OE2 which is a second optical element.

FIG. 3 is a perspective view showing the first wave plate OE1 which is the first optical element and the second wave plate OE2 which is the second optical element. In FIG. 3, on the optical surface of the first wave plate OE1 in a laminar shape, a first optical area A and a second optical area B are formed on both sides of an optical axis which is not drawn. In the first optical area A, a plurality of fine walls WA are arranged at even intervals. In the second optical area B, a plurality of fine walls WB are arranged at even intervals. The respective walls WB and WA cross at right angles so that the ends thereof are joined to each other. The walls WA and WB form a structural birefringence structure with a height of h.

Similarly, on the optical surface of the second wave plate OE2 in a laminar shape, a third optical area C and a fourth optical area D are formed on both sides of the optical axis which is not drawn. In the third optical area C, a plurality of fine walls WC are arranged at even intervals and are orthogonal to the walls WA opposite to them in the optical axial direction viewed in the optical axial direction. In the fourth optical area D, a plurality of fine walls WD are arranged at even intervals and are orthogonal to the walls WB opposite to them in the optical axial direction viewed in the optical axial direction. The respective walls WC and WD cross at right angles so that the ends thereof are joined to each other and the walls WC and WD form a structural birefringence structure with a height of h.

Out of the light flux which have passed through the first wave plate OE1 and second wave plate OE2, the light flux passing through the first optical area A and fourth optical area D and the light flux passing through the second optical area B and third optical area C are changed in the polarization direction by 90° and the light flux passing through the first optical area A and third optical area C and the light flux passing through the second optical area B and fourth optical area D are kept unchanged in the polarization direction. As a concrete example, it may be considered that these optical areas provide a phase difference of $+\lambda/4$ with the light flux passing through the first optical area A, and provide a phase difference of $-\lambda/4$ with the light flux passing through the second optical area B. Further, it may be considered that these optical areas provide a phase difference of $-\lambda/4$ with the light flux passing through the third optical area C, and provide a phase difference of $+\lambda/4$ with the light flux passing through the fifth optical area D. Another example can be considered that these optical areas provide a phase difference of $+\lambda/2$ with the light flux passing through the first optical area A, provide no phase difference with the light flux passing through the second optical area B, provide a phase difference of $+\lambda/2$ with the light flux passing through the third optical area C, and provide no phase difference with the light flux passing through the fourth optical area D. Here, when the intervals between the walls WA to WD and heights thereof are adjusted, a constitution that only specific wavelengths are reacted may be formed such that when light flux of a wavelength of $\lambda 2$ (350 nm$\leq \mu 2 \leq$450 nm) passes, structural birefringence is caused or when light flux of a wavelength of $\lambda 1$ (750 nm$\leq \lambda 1 \leq$800 nm) passes, structural birefringence is caused.

In the optical pickup apparatus shown in FIG. 2, a semiconductor laser LD1 is permitted to emit light for recording and/or regenerating information on the DVD. The divergent light flux emitted from the semiconductor laser LD1, as drawn as solid lines in FIG. 2, passes a first coupling lens CL1, and is converted to a parallel light flux. The parallel light flux is then reflected by a first polarized beam splitter BS1. The reflected light flux passes through an expander lens EXP composed of a convex lens L1 and a concave lens L2, and a $\lambda/4$ wave plate QWP, then the light flux diameter is regulated by an aperture diaphragm not drawn. Then, the light flux is converged by the objective lens OBJ, and becomes a spot formed on an information recording surface RL1 on which information is to be recorded and/or reproduced in the DVD. The objective lens OBJ performs the focusing operation and tracking operation by a biaxial actuator (not drawn) arranged around the objective lens.

The light flux on the information recording surface RL1 is reflected and modulated by the information pit and passes again the objective lens OBJ, $\lambda/4$ wave plate QWP, the expander lens EXP, and the first polarized beam splitter BS1. The light flux emitted from the first polarized beam splitter BS1 is converted to a convergent light flux by a lens L3 which is a light-converging element. The convergent light passes through the first wave plate OE1, and most of the light is converged between the first wave plate OE1 and the second wave plate OE2. Then, the light flux passes through the second wave plate OE2, and is converted to a parallel light flux by a lens L4.

As mentioned above, out of the light flux having passes through the first wave plate OE1 and second wave plate OE2, the reflected light (main light flux) from the information recording surface RL1 on which information is to be recorded and/or reproduced has the polarization direction inclined at 90°. Therefore, the light flux is reflected by a second polarized beam splitter BS2 which is a polarization splitting means (a polarization splitting optical member). The reflected light flux is converged by a lens L5, is added with astigmatism by a sensor lens SEN. At last, the light flux is converged on the light receiving surface of a photodetector PD. By using the output signal of the photodetector PD, the information recorded on the DVD can be read. When recording and/or producing information on another information recording surface in the optical pickup apparatus, the lens L2 in the expander lens EXP is moved along the optical axis to change the light-converging position in the DVD.

According to this embodiment, out of the light flux which has passed through the first wave plate OE1 and second wave plate OE2, the reflected light (secondary light flux) from an information recording surface other than the information recording surface on which information is to be recorded and/or reproduced, which is a noise component, is not converged by the lens L3 between the first wave plate OE1 and the second wave plate OE2 and the polarization direction is unchanged. Therefore, the secondary light flux passes through the second polarized beam splitter BS2, thereby does not reach the photodetector PD, thus an occurrence of an error can be suppressed. Further, the optical path of the light flux toward the photodetector PD is bent by a mirror M, so that the constitution of the optical pickup apparatus PU1 can be made compact.

Furthermore, according to the present embodiment, when the magnification m when the light flux reflected from the information recording surface is converged by the light-converging element (lens L3) satisfies the expression (1), the interval d between the first wave plate OE1 and the second wave plate OE2 do not become excessively smaller, and the two optical elements can be aligned easily. Therefore, a constitution that the shift sensitivity in the vertical direction to the optical axis is low can be provided. Furthermore, the normal information recording light and noise component light can be separated easily. Additionally, it provides the larger effective area D of the first wave plate OE1 and second wave plate OE2, the moderate alignment accuracy, and the low error sensitivity in the vertical direction to the optical axis, and the increased signal light reading accuracy. On the other hand, when the magnification m satisfies the expression (1), the first wave plate OE1 and second wave plate OE2 themselves can be made smaller, and the optical system composed of the lens L3, first wave plate OE1, and second wave plate OE2 can be made smaller, and the incident spot diameter to the first wave plate OE1, that is, the effective area D can be ensured greatly.

Figure 4:
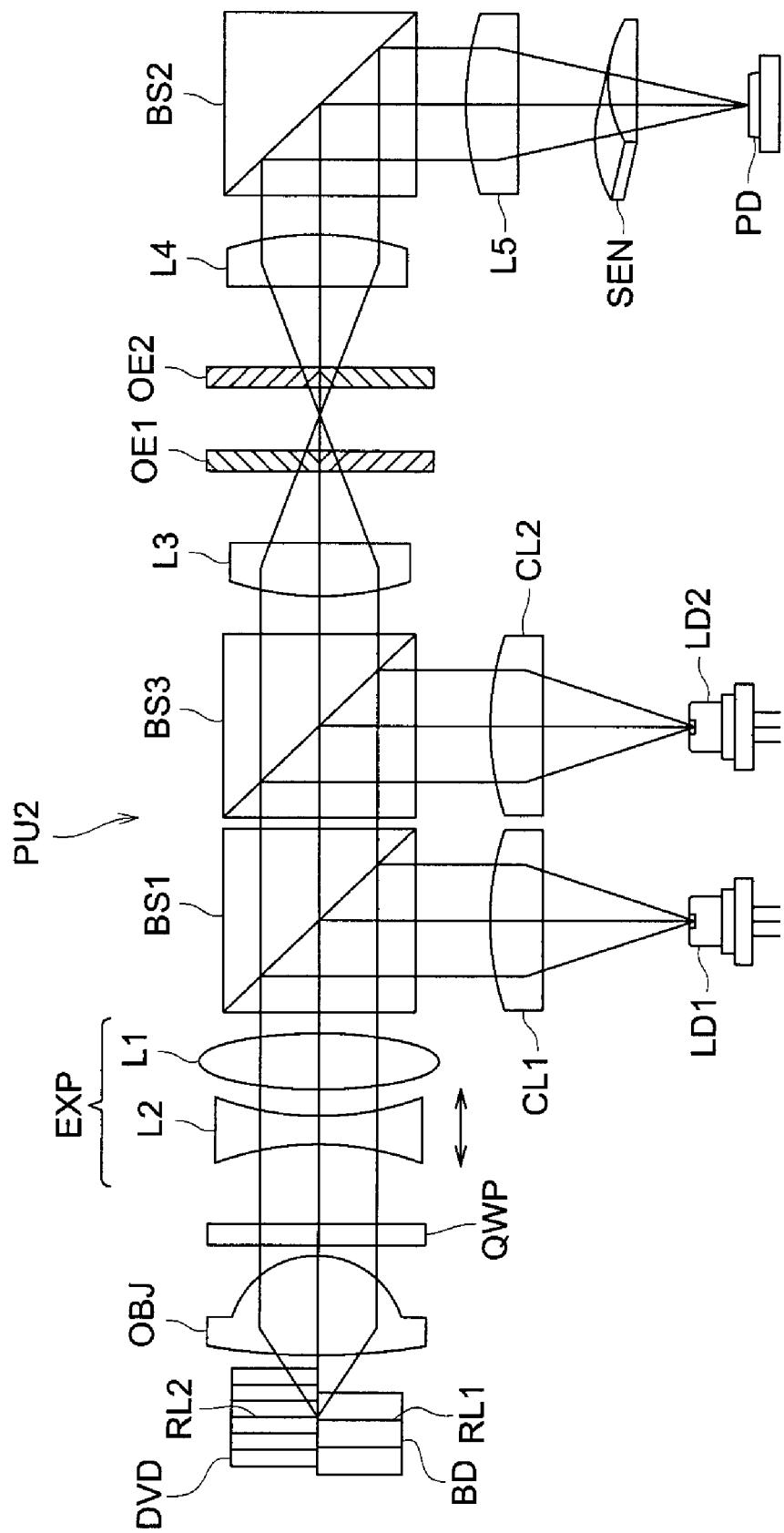
FIG. 4 is a schematic block diagram of an optical pickup apparatus PU2 relating to the second embodiment.

FIG. 4 is a drawing showing schematically the constitution of the optical pickup apparatus PU2 of the second embodiment for appropriately recording and reproducing information on a BD and a DVD each of which is an optical information recording medium (may be referred to as an optical disc) having a multilayered information recording surfaces.

When recording and/or regenerating information on the BD, the lens L2 of the expander lens EXP moves along the optical axial, whereby the spherical aberration of the converged spot on the information recording surface RL1 is minimized. When the first semiconductor laser LD1 is permitted to emit light, the divergent light flux with a wavelength $\lambda 1$ (about 400 nm) emitted from the semiconductor laser LD1, as shown in FIG. 4, passes through a first coupling lens CL1 and is converted to a parallel light flux. The parallel light flux is reflected by the first polarized beam splitter BS1 and passes through the expander lens EXP composed of the convex lens L1 and concave lens L2, and the $\lambda/4$ wave plate QWP.

Then, the light flux diameter is regulated by an aperture diaphragm not drawn, and the light flux becomes a spot formed on the information recording surface RL1 of the BD on which information is to be recorded and/or reproduced by an objective lens OBJ. The objective lens OBJ performs the focusing operation and tracking operation by a biaxial actuator (not drawn) arranged around the objective lens.

The light flux on the information recording surface RL1 is reflected and modulated by the information pit and passes again the objective lens OBJ, λ/4 wave plate QWP, and the expander lens EXP. The light flux then passes through the first polarized beam splitter BS1 and third polarized beam splitter BS3. The light flux emitted from the third polarized beam splitter BS3 is converted to a convergent light flux by a lens L3 which is a light-converging element, and passes through the first wave plate OE1. Most of the convergent light flux is converged between the first wave plate OE1 and the second wave plate OE2, then passes the second wave plate OE2. Then, the light flux is converted to a parallel light flux by a lens L4.

As mentioned above, out of the light flux having passes through the first wave plate OE1 and second wave plate OE2, the reflected light (main light flux) from the information recording surface RL1 on which information is to be recorded and/or reproduced has the polarization direction inclined at 90°. Therefore, the light flux is reflected by a second polarized beam splitter BS2 which is a polarization splitting means (a polarization splitting optical member). The reflected light flux is converged by a lens L5, is added with astigmatism by a sensor lens SEN. At last, the light flux is converged on the light receiving surface of a photodetector PD. By using the output signal of the photodetector PD, the information recorded on the BD can be read.

On the other hand, out of the light flux which has passed through the first wave plate OE1 and second wave plate OE2, the reflected light (secondary light flux) from an information recording surface other than the information recording surface on which information is to be recorded and/or reproduced, which is a noise component, is not converged by the lens L3 between the first wave plate OE1 and the second wave plate OE2 and the polarization direction is unchanged. Therefore, the secondary light flux passes through the second polarized beam splitter BS2, thereby does not reach the photodetector PD, thus an occurrence of an error can be suppressed.

When recording and/or reproducing information on the DVD, the lens L2 of the expander lens EXP is moved along the optical axis, thereby the spherical aberration of the converged spot on an information recording surface RL2 is minimized. When a second semiconductor laser LD2 is permitted to emit light, the divergent light flux with a wavelength of λ2 (about 650 nm) is emitted from the semiconductor laser, as shown in FIG. 4. The light flux passes through a second coupling lens CL2 and is converted to a parallel light flux. The parallel light flux, then, is reflected by the third polarized beam splitter BS3, and passes through the first polarized beam splitter BS1 and the expander lens EXP composed of the convex lens L1 and the concave lens L2. The light flux further passes through the λ/4 wave plate QWP, then the light flux diameter is regulated by an aperture diaphragm which is not drawn. The light flux becomes a spot formed on an information recording surface RL2 of the DVD by the objective lens OBJ. The objective lens OBJ performs the focusing operation and tracking operation by a biaxial actuator (not drawn) arranged around the objective lens.

The light flux on the information recording surface RL2 is reflected and modulated by the information pit and passes again the objective lens OBJ and λ/4 wave plate QWP and the expander lens EXP. The light flux then passes through the first polarized beam splitter BS1 and third polarized beam splitter BS3. The light flux emitted from the third polarized beam splitter BS3 is converted to a convergent light flux by a lens L3 which is a light-converging element, and passes through the first wave plate OE1. Most of the convergent light flux is converged between the first wave plate OE1 and the second wave plate OE2, then passes the second wave plate OE2. Then, the light flux is converted to a parallel light flux by a lens L4.

As mentioned above, out of the light flux having passes through the first wave plate OE1 and second wave plate OE2, the reflected light (main light flux) from the information recording surface on which information is to be recorded and/or reproduced has the polarization direction inclined at 90°. Therefore, the light flux is reflected by a second polarized beam splitter BS2 which is a polarization splitting means (a polarization splitting optical member). The reflected light flux is converged by a lens L5, is added with astigmatism by a sensor lens SEN. At last, the light flux is converged on the light receiving surface of a photodetector PD. By using the output signal of the photodetector PD, the information recorded on the DVD can be read.

On the other hand, out of the light flux which has passed through the first wave plate OE1 and second wave plate OE2, the reflected light (secondary light flux) from an information recording surface other than the information recording surface on which information is to be recorded and/or reproduced, which is a noise component, is not converged by the lens L3 between the first wave plate OE1 and the second wave plate OE2 and the polarization direction is unchanged. Therefore, the secondary light flux passes through the second polarized beam splitter BS2, thereby does not reach the photodetector PD, thus an occurrence of an error can be suppressed.

Further, the compatible optical disc is not limited to a combination of the BD and DVD.

FIG. 5(a) is a drawing showing the relationship between the magnification when the light flux reflected by the one of the multilayered information recording surfaces is converged by the light-converging element and the maximum distance between the first optical element and the second optical element when the BD is used as an optical disc. FIG. 5(b) is a drawing showing the relationship between the magnification and the effective area of the first optical element and the second optical element. When there is an optical pickup apparatus configured to satisfy: the layer distance between information recording surfaces of the optical information recording medium δ=10 μm; the numerical aperture of the objective lens on an optical information recording medium side NA=0.85, the light source wavelength satisfies λ=405 nm; and the refractive index of the optical disc=1.6, the conditional expression (1) provides the range of the magnification m: 0.85/0.35≦m≦0.85/0.05, that is, 2.43≦m≦17. Here, assuming the magnification m as 5, it can be seen that the maximum distance d is 0.7 mm and the effective area D is 140 μm.

FIG. 6(a) is a drawing showing the relationship between the magnification and the maximum distance when the HD DVD is used as an optical disc. FIG. 6(b) is a drawing showing the relationship between the magnification and the effective area. When there is an optical pickup apparatus configured to satisfy: the layer distance δ=20 μm, the numerical aperture NA=0.65, the light source wavelength λ=405 nm, and the refractive index of the optical disc=1.6, the conditional expression (1) provide the range of the magnification m: 0.65/0.35≦m≦0.65/0.05, that is, 1.86≦m≦13. Here, assuming the magnification m as 5, it can be seen that the maximum distance d is 1.5 mm and the effective area D is 210 µm.

Figure 7:
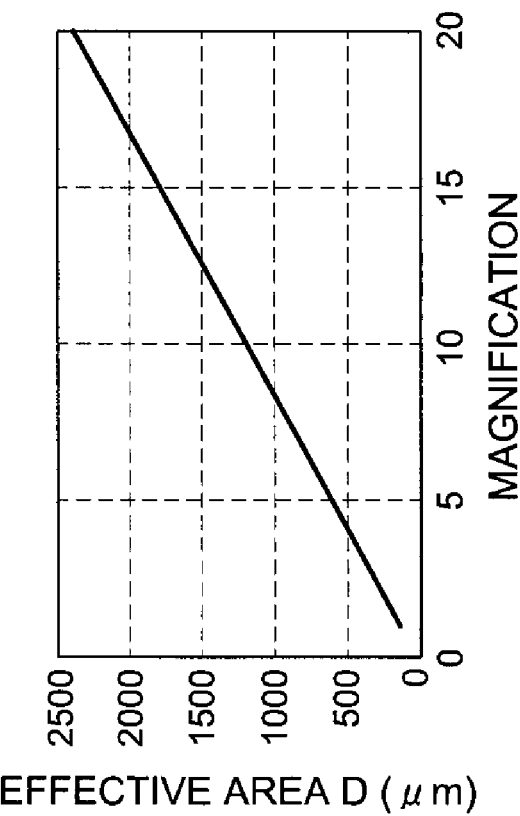
FIG. 7(a) is a drawing showing the relationship between the magnification and the maximum distance and FIG. 7(b) is a drawing showing the relationship between the magnification and the effective area, when DVD is used as an optical disc.
Figure 7:
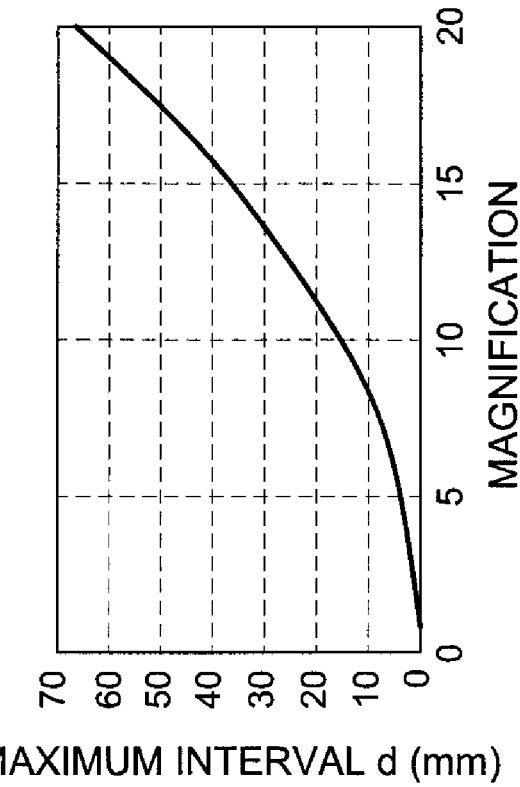

FIG. 7(*a*) is a drawing showing the relationship between the magnification and the maximum distance when the DVD is used as an optical disc. FIG. 7(*b*) is a drawing showing the relationship between the magnification and the effective area. When there is an optical pickup apparatus configured to satisfy: the layer distance δ=55 µm, the numerical aperture NA=0.65, the light source wavelength λ=658 nm, and the refractive index of the optical disc=1.6, the conditional expression (1) provides the range of the magnification m: 0.65/0.35≦m≦0.65/0.05, that is, 1.86≦m≦13. Here, assuming the magnification m as 5, it can be seen that the maximum distance d is 4.4 mm and the effective area D is 570 µm.

Figure 5:
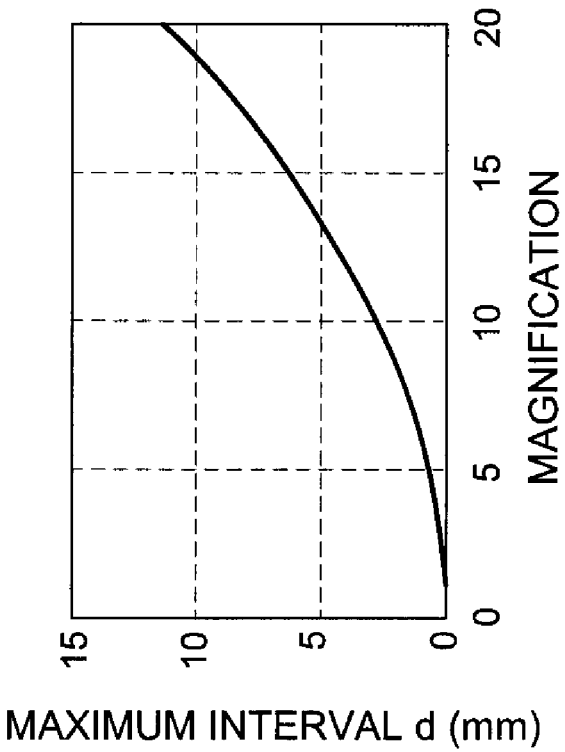
FIG. 5(a) is a drawing showing the relationship between the magnification and the maximum distance and FIG. 5(b) is a drawing showing the relationship between the magnification and the effective area, when BD is used as an optical disc.
Figure 5:
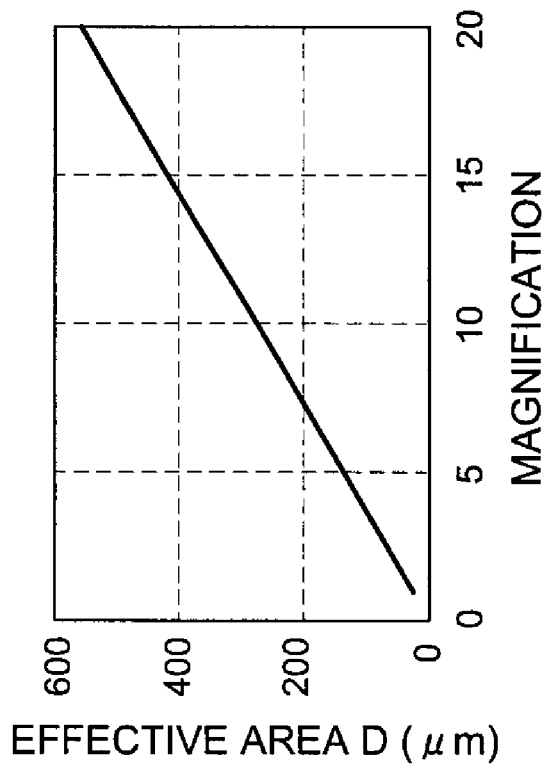

As can be seen from FIGS. 5(*a*), 5(*b*), 6(*a*), 6(*b*), 7(*a*), and 7(*b*), when the magnification m becomes NA/0.35 or more, at least 150 µm of the maximum distance d and at least 50 µm of the effective area D are secured at the same time among the different optical discs. Therefore, information can be recorder and/or reproduced properly. When the magnification m becomes NA/0.33 or more, at least 190 µm of the maximum distance d and at least 70 µm of the effective area D are secured at the same time among the different optical discs, which is more preferable.

On the other hand, when the magnification m becomes NA/0.05 or less, at least 30 mm or less of the maximum distance d and at least 1.5 mm or less of the effective area D are secured at the same time among the different optical discs. Therefore, there can be provided a small-sized optical pickup apparatus in which information can be recorder and/or reproduced properly. When the magnification m becomes NA/0.07 or less, at least 11 mm or less of the maximum distance d and at least 1.0 mm or less of the effective area D are secured at the same time among the different optical discs, which is more preferable.

Figure 8A:
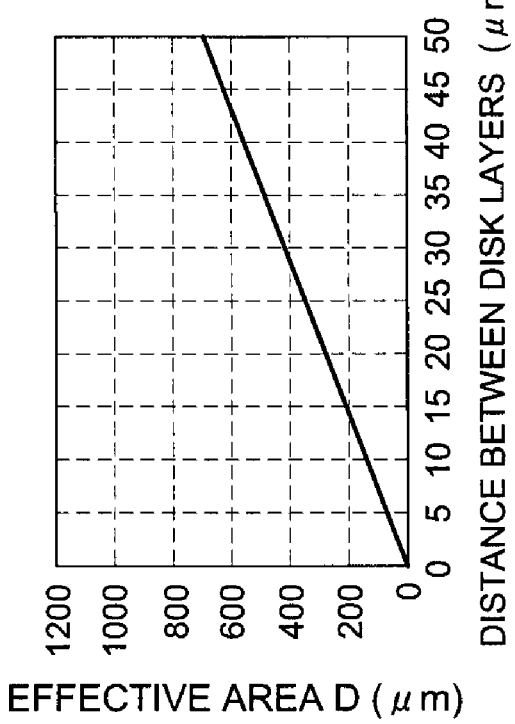
FIG. 8(a) is a drawing showing the relationship between the maximum distance and the layer distance of the optical disc and FIG. 8(b) is a drawing showing the relationship between the effective area and the layer distance of the optical disc, when BD is used as an optical disc.
Figure 8B:
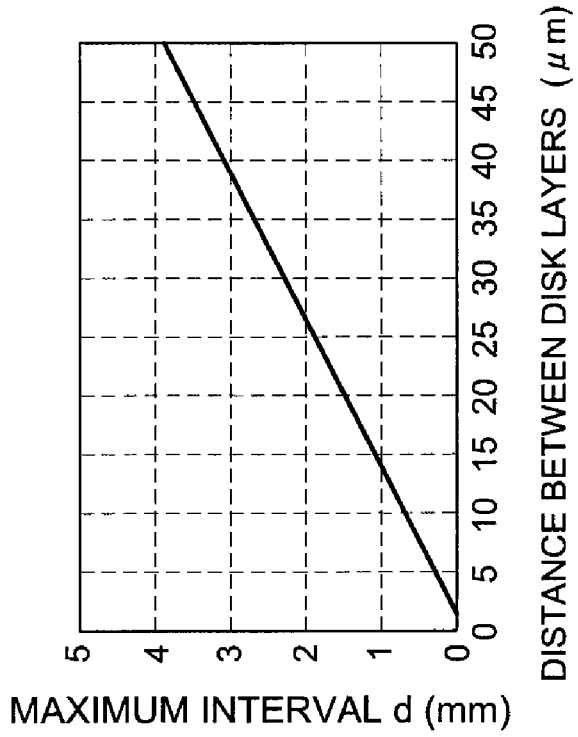

FIG. 8(*a*) is a drawing showing the relationship between the layer distance between the information recording surfaces of the optical disc and the maximum distance of the first optical element and the second optical element when the BD is used as an optical disc. FIG. 8(*b*) is a drawing showing the relationship between the layer distance between information recording surfaces of the optical disc and the effective area of the first optical element and the second optical element. From the conditional expression (2), the range of the layer distance δ of the BD is 3.6 µm≦δ≦35 µm. Therefore, when there is an optical pickup apparatus configured to satisfy: the light source wavelength λ=405 nm, the numerical aperture NA=0.85, the magnification m=5, the refractive index of the optical disc=1.6, and the layer distance δ=10 µm, it can be seen that the maximum distance d is 0.7 mm and the effective area D is 140 µm.

Figure 9A:
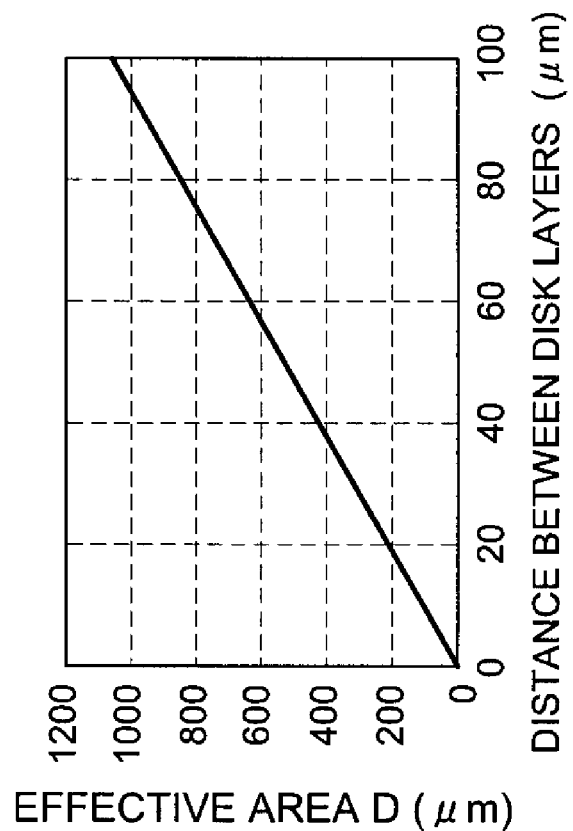
FIG. 9(a) is a drawing showing the relationship between the maximum distance and the layer distance of the optical disc and FIG. 9(b) is a drawing showing the relationship between the effective area and the layer distance of the optical disc, when HD DVD is used as an optical disc.
Figure 9B:
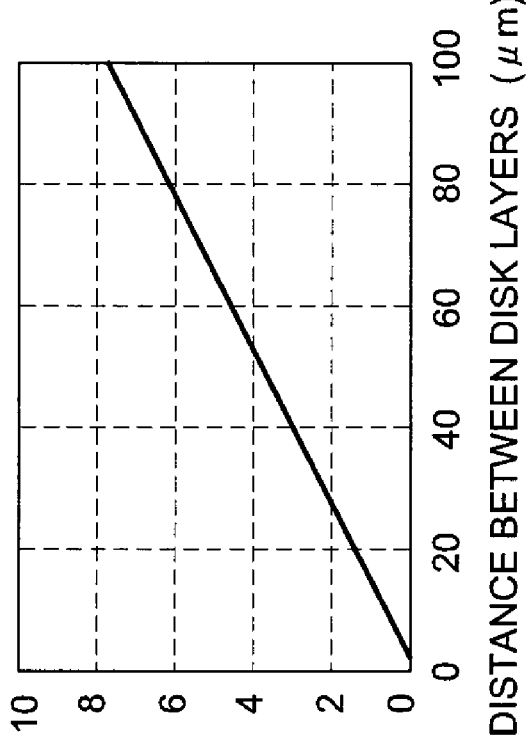

FIG. 9(*a*) is a drawing showing the relationship between the layer distance of the optical disc and the maximum distance when the HD DVD is used as an optical disc. FIG. 9(*b*) is a drawing showing the relationship between the layer distance of the optical disc and the effective area. From the conditional expression (3), the range of the layer distance δ of the HD DVD is 4.3 µm≦δ≦80 am. Therefore, when there is an optical pickup apparatus configured to satisfy: the light source wavelength λ=405 nm, the numerical aperture NA=0.65, the magnification m=5, and the refractive index of the optical disc=1.6, and the inter-layer distance δ=20 µm, it can be seen that the maximum distance d is 1.5 mm and the effective area D is 210 µm.

Figure 10:
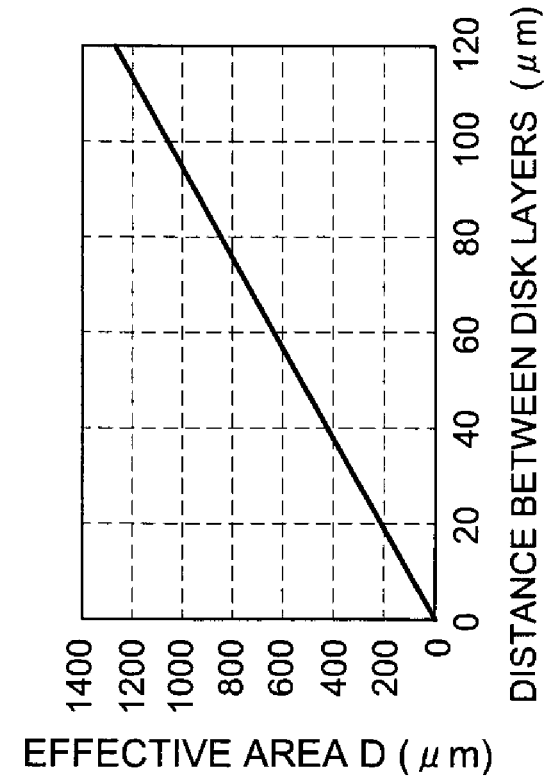
FIG. 10(a) is a drawing showing the relationship between the maximum distance and the layer distance of the optical disc and FIG. 10(b) is a drawing showing the relationship between the effective area and the layer distance of the optical disc, when a DVD is used as an optical disc.
Figure 10:
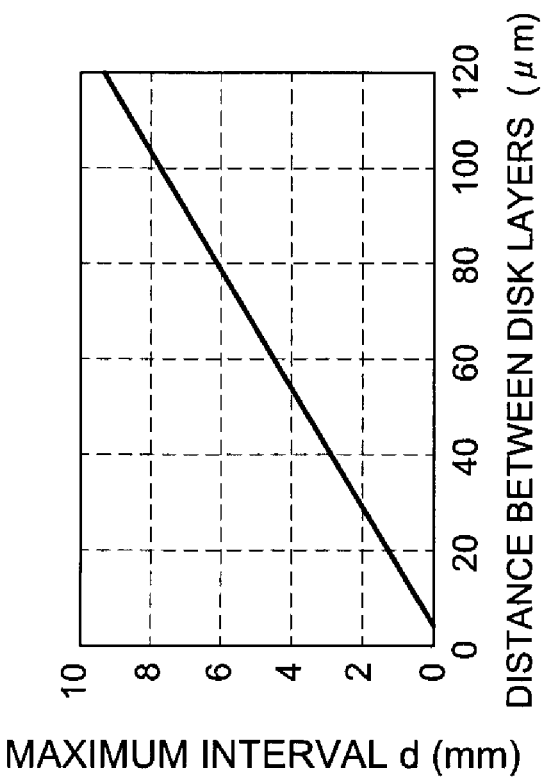

FIG. 10(*a*) is a drawing showing the relationship between the layer distance of the optical disc and the maximum distance when the DVD is used as an optical disc. FIG. 10(*b*) is a drawing showing the relationship between the layer distance of the optical disc and the effective area. From the conditional expression (4), the range of the layer distance δ of the DVD is 5.5 µm≦δ≦100 µm. When there is an optical pickup apparatus configured to satisfy: the light source wavelength λ=658 nm, the numerical aperture NA=0.65, the magnification m=5, the refractive index of the optical disc=1.6, and the layer distance δ=25 µm, it can be seen that the maximum distance d is 1.75 mm and the effective area D is 260 µm.

Figure 11:
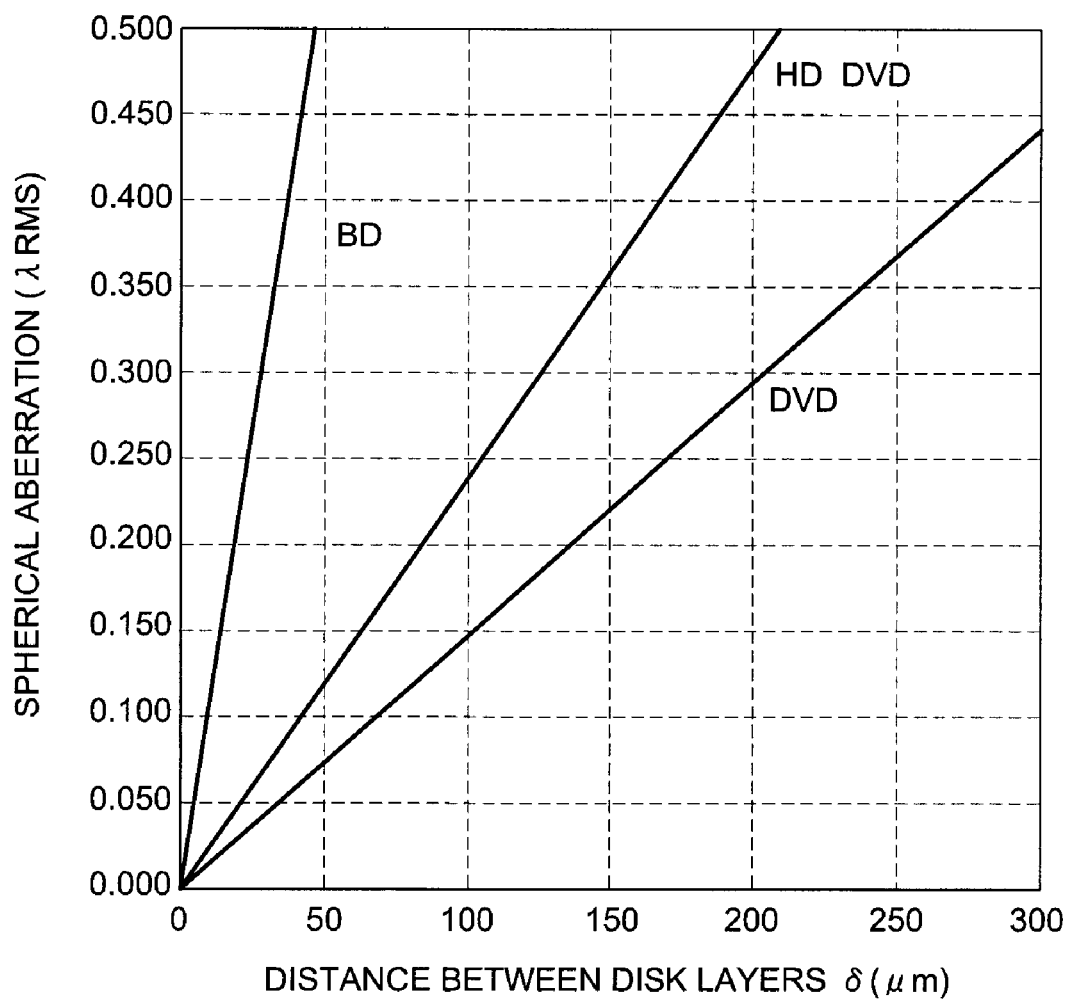
FIG. 11 is a drawing showing the relationship between the wavefront aberration and the layer distance of the optical disc.

FIG. 11 is a drawing showing the relationship between the layer distance of the optical disc and the wavefront aberration. When the layer distance δ is 10 µm, the wavefront aberration of the BD is 0.1 λrms and the wavefront aberration of the HD DVD and DVD is 0.01 λrms or less.

DESIGN EXAMPLE 1

In the optical pickup apparatus for a BD in which the layer distance δ=10 µm, the numerical aperture NA=0.85, the light source wavelength λ=405 nm, and the refractive index of the optical disc of 1.6 is provided, the magnification m is set to 5 from the conditional expression (1). At that time, the maximum distance d is 714 µm and the effective area D is 136 µm.

DESIGN EXAMPLE 2

In the optical pickup apparatus compatible for a BD and an HD DVD, the first optical element and second optical element are filled with a medium with a refractive index of 1.6. In the optical pickup apparatus satisfying for BD: the layer distance δ=10 µm; the numerical aperture NA=0.85; the light source wavelength λ=405 nm; and the refractive index of the optical disc=1.6, and satisfying for HD DVD: the layer distance δ=20 µm; the numerical aperture NA=0.65; the light source wavelength λ=405 nm, and the refractive index of the optical disc=1.6, the magnification m is set to 7 from the conditional expression (1). At that time, the maximum distance d is 810 µm and the effective area D is 119 µm for the BD, and the maximum distance d is 1670 µm and the effective area D is 182 µm for the HD DVD. Here, the first optical element and second optical element are used in common, so that the maximum distance d of the BD=810 µm is used, thus the maximum area D of the HD DVD is 182×(810/1670)=88 µm.

Figure 12:
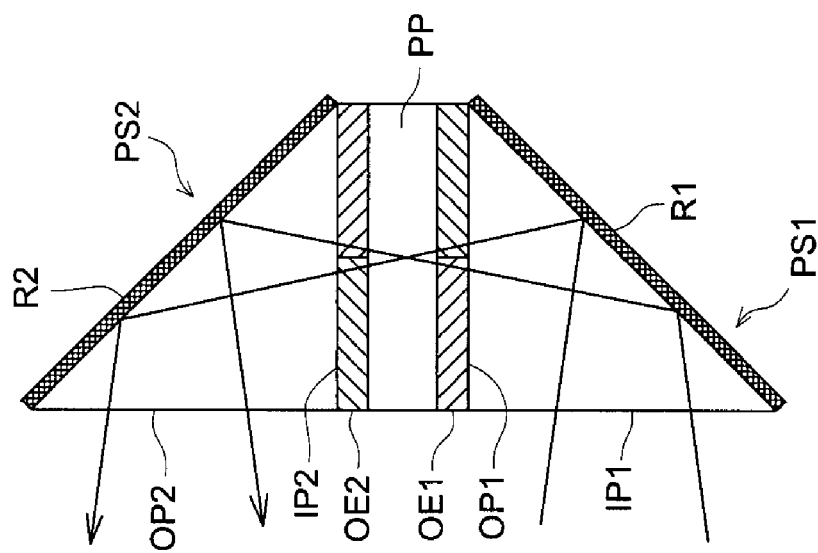
FIG. 12 is a drawing showing a constitution example of the first optical element and second optical element.
Figure 12:
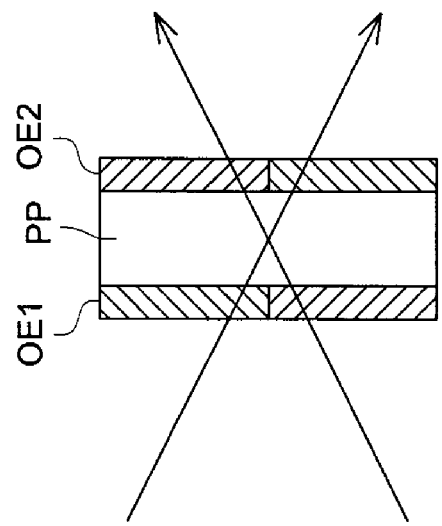
Figure 12:
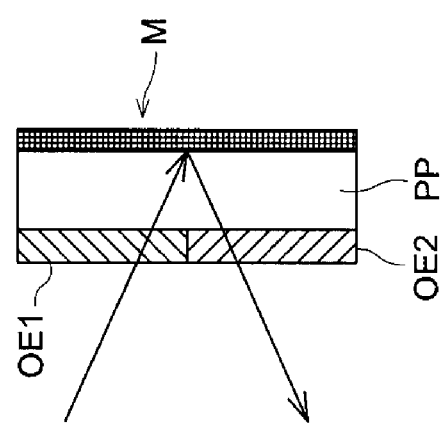

Each of FIGS. 12(*a*) to 12(*c*) is a drawing showing a constitution example of the first optical element and second optical element. In FIG. 12(*a*), the first optical element OE1 and second optical element OE2 are integrated in one body with each other by adhering and arranging a parallel flat plate PP between them. By use of such a constitution, the adjustment of the optical axis at time of assembly is not necessary and the handling property is excellent.

In FIG. 12(*b*), the structural birefringence structure OE1 and structural birefringence structure OE2 are arranged on both sides of the optical axis on the same plane, and the mirror M is arranged opposite to them across the parallel flat plate PP, thus these elements are integrated in one body. In such a case, the structural birefringence structure OE1 serves as both functions of the first optical area A and third optical area C, and the structural birefringence structure OE2 serves as both functions of the second optical area B and fourth optical area D. Therefore, the structural birefringence structures OE1 and OE2 arranged on the same plane have each function of the first optical element and second optical element.

Namely, the reflected light (main light flux) from the information recording surface on which information is to be recorded and/or reproduced enters into the structural birefringence structure OE1 corresponding to the first optical function area A and then is converged between the structural birefringence structure OE1 and the mirror M, and the reflected light flux by the mirror M is emitted via the structural birefringence structure OE2 corresponding to the fourth optical function area D. Further, the reflected light (main light flux) from the information recording surface on which information is to be recorded and/or reproduced enters into the structural birefringence structure OE2 corresponding to the second optical function area B and then is converged between the structural birefringence structure OE2 and the mirror M, and the reflected light flux is emitted via the structural birefringence structure OE1 corresponding to the third optical function area C.

On the other hand, the reflected light (secondary light flux) from an information recording surface other than the information recording surface on which information is to be recorded and/or reproduced enters into the structural birefringence structure OE1 corresponding to the first optical function area A and then is reflected by the mirror M, and the reflected light flux is emitted via the structural birefringence structure OE1 corresponding to the third optical function area C. Further, the reflected light (secondary light flux) from the information recording surface other than the information recording surface on which information is to be recorded and/or reproduced enters into the structural birefringence structure OE2 corresponding to the second optical function area B and then is reflected by the mirror M, and the reflected light flux by the mirror M is emitted via the structural birefringence structure OE2 corresponding to the fourth optical function area D. By doing this, as mentioned above, only the reflected light from the information recording surface on which information is to be recorded and/or reproduced travels toward the photodetector.

As shown by the above, when the structural birefringence structure is formed above the mirror M, the first optical element OE1 and second optical element OE2 can be provided as one common element.

In FIG. 12(c), a first prism PS1 includes an incident surface IP1, a reflection surface R1, and an emission surface OP1. On the emission surface OP1, the structural birefringence structure OE1 including the first area A and second area B composed of a plurality of fine walls (refer to FIG. 2) is formed. Further, a second prism PS2 has an incident surface IP2, a reflection surface R2, and an emission surface OP2. On the incident surface IP2, the structural birefringence structure OE2 including the third area C and fourth area D composed of a plurality of fine walls (refer to FIG. 2) is formed. Between the first prism PS1 and the second prism PS2, the parallel flat plate PP is adhered and arranged.

In FIG. 12(c), the convergent light reflected by the optical disc passes through the incident surface IP1 of the first prism PS1, and is reflected by the reflection surface R1. The reflected light passes through the structural birefringence structure OE1 formed on the emission surface OP1, then is converged inside of the parallel flat plate PP. The light flux furthermore passes through the structural birefringence structure OE2 formed on the incident surface IP2 of the second prism PS2, and is reflected by the reflection surface R2. The light flux is emitted from the emission surface OP2, thus similar to the above embodiments, only the reflected light from the information recording surface on which information is to be recorded and/or reproduced travels toward the photodetector. Further, the inside of the parallel flat plate PP may be an air layer.

The present invention is explained above by referring to the embodiments thereof, though the present invention is not limited to the embodiments aforementioned, and needless to say, it can be changed and modified properly.

What is claimed is:

1. An optical pickup apparatus for recording and/or reproducing information on an optical information recording medium including multilayered information recording surfaces, the optical pickup apparatus comprising:

a light source;

an objective lens for converging a light flux from the light source onto one of the multilayered information recording surfaces;

a first optical element comprising a first optical area and a second optical area which are arranged on both sides of an optical axis;

a second optical element comprising a third optical area and a fourth optical area which are arranged on both sides of the optical axis;

a light-converging element for receiving a main light flux and a secondary light flux and converging the main light flux at a position between the first optical element and the second optical element, the main light flux being a light flux reflected by the one of the multilayered information recording surfaces on which the light flux from the light source is converged and the secondary light flux being a light flux reflected by another of the multilayered information recording surfaces;

a polarization splitting optical member for splitting the main light flux and the secondary light flux each emitted from the first optical element and the second optical element; and a photodetector for receiving the main light flux, wherein the optical pickup apparatus records and/or reproduces information by converging the light flux from the light source on the one of the multilayered information recording surfaces through the objective lens, wherein the first optical area and the fourth optical area provide a first polarization direction with the main light flux passing through the first optical area and the fourth optical area, the second optical area and the third optical area provide a first polarization direction with the main light flux passing through the second optical area and the third optical area, the first optical area and the third optical area provide a second polarization direction with the secondary light flux passing through the first optical area and the third optical area, and the second optical area and the fourth optical area provide a second polarization direction with the secondary light flux passing through the second optical area and the fourth optical area, wherein the main light flux passes through the first optical element and is converged between the first optical element and the second optical element by the light-converging element, and the main light flux passes through the second optical element and enters into the photodetector through the polarization splitting optical member, wherein the secondary light flux passes through the first optical element and is not converged between the first optical element and the second optical element by the light-converging element, and the secondary light flux passes through the second optical element and does not enter into the photodetector by being split out by the polarization splitting optical member, and wherein the optical pickup apparatus satisfies a following expression:

$NA/0.35 \leq m \leq NA/0.05$, where m is a magnification when the light flux reflected by the one of the multilayered information recording surfaces is converged by the light-converging element, and NA is a numerical aperture of the objective lens on an optical information recording medium side.

2. The optical pickup apparatus of claim 1, satisfying a following expression:

$NA/0.33 \leq m \leq NA/0.08$.

3. The optical pickup apparatus of claim 1,
wherein the light flux emitted by the light source has a wavelength λ1 satisfying 350 nm≤λ1≤450 nm, and
when the numerical aperture NA is 0.8 or more, a distance δ between the multilayered information recording surfaces of the information recording medium satisfies a following expression:

3.6 μm≤δ≤35 μm.

4. The optical pickup apparatus of claim 1,
wherein the light flux emitted by the light source has a wavelength λ1 satisfying 350 nm≤λ1≤450 nm, and
when the numerical aperture NA is less than 0.8, a distance δ between the multilayered information recording surfaces of the information recording medium satisfies a following expression:

4.3 μm≤δ≤80 μm.

5. The optical pickup apparatus of claim 1,
wherein the light flux emitted by the light source has a wavelength λ2 satisfying 600 nm≤λ2≤700 nm, and
when the numerical aperture NA is less than 0.8, a distance δ between the multilayered information recording surfaces of the information recording medium satisfies a following expression:

5.5 μm≤δ≤100 μm.

6. The optical pickup apparatus of claim 1,
wherein the first optical element and the second optical element are integrated in one body.

7. The optical pickup apparatus of claim 1, further comprising a reflection optical element on an optical path between the first optical element and the second optical element.

8. The optical pickup apparatus of claim 7,
wherein the first optical element, the second optical element, and the reflection optical element are integrated in one body.

9. The optical pickup apparatus of claim 1, further comprising:
a first reflection surface for reflecting a light flux to enter into the first optical element; and
a second reflection surface for reflecting a light flux emitted by the second optical element.

10. The optical pickup apparatus of claim 1,
wherein only when a light flux with a predefined wavelength enters into the first optical element and the second optical element, the main light flux and the secondary light flux each of which has been emitted by the first optical element and the second optical element have different polarization directions from each other.

* * * * *